(12) United States Patent
Ståhlberg

(10) Patent No.: US 9,092,823 B2
(45) Date of Patent: Jul. 28, 2015

(54) INTERNET FRAUD PREVENTION

(75) Inventor: Mika Ståhlberg, Espoo (FI)

(73) Assignee: F-SECURE OYJ, Helsink (FI)

( * ) Notice: Subject to any disclaimer, the term of this patent is extended or adjusted under 35 U.S.C. 154(b) by 1544 days.

(21) Appl. No.: 11/806,568

(22) Filed: Jun. 1, 2007

(65) Prior Publication Data

US 2008/0301051 A1 Dec. 4, 2008

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06Q 40/02* | (2012.01) |
| *G06F 21/50* | (2013.01) |
| *G06Q 20/40* | (2012.01) |

(52) U.S. Cl.
CPC ............... *G06Q 40/02* (2013.01); *G06F 21/50* (2013.01); *G06Q 20/40* (2013.01)

(58) Field of Classification Search
None
See application file for complete search history.

(56) References Cited

U.S. PATENT DOCUMENTS

| 7,185,232 | B1 * | 2/2007 | Leavy et al. ................... 714/41 |
| 7,698,442 | B1 * | 4/2010 | Krishnamurthy et al. .... 709/229 |
| 7,818,809 | B1 * | 10/2010 | Sobel et al. ..................... 726/26 |
| 2005/0268112 | A1 * | 12/2005 | Wang et al. ................... 713/188 |
| 2005/0283836 | A1 * | 12/2005 | Lalonde et al. ................. 726/24 |
| 2006/0075500 | A1 * | 4/2006 | Bertman et al. ................ 726/24 |
| 2007/0061596 | A1 * | 3/2007 | Ferguson et al. ............. 713/193 |
| 2007/0079361 | A1 * | 4/2007 | Hays et al. ....................... 726/5 |
| 2007/0136579 | A1 * | 6/2007 | Levy et al. .................... 713/168 |
| 2007/0250927 | A1 * | 10/2007 | Naik et al. ....................... 726/22 |
| 2008/0222736 | A1 * | 9/2008 | Boodaei et al. ................. 726/27 |
| 2009/0138573 | A1 * | 5/2009 | Campbell et al. ............. 709/218 |

OTHER PUBLICATIONS

O. in view of Hays et al., US Pub. No. 2008/0222736as.*
Kirda et al., Noxes: A Client-Side Solution for Mitigating Cross-Site Scripting Attacks, Apr. 23-27, 2006, SAC'06, pp. 330-335.*

* cited by examiner

*Primary Examiner* — Nadia Khoshnoodi
(74) *Attorney, Agent, or Firm* — Nixon & Vanderhye, P.C.

(57) ABSTRACT

A method of detecting malware on a computer and comprising scanning a system memory of the computer, and/or code being injected into the system memory, for known strings indicative of banking trojans. These strings may be Universal Resource Locators and/or partial Universal Resource Locators.

17 Claims, 5 Drawing Sheets

INTERNET FRAUD PREVENTION

FIELD OF THE INVENTION

The present invention relates to Internet fraud prevention and in particular, though not necessarily, to a method and apparatus for providing protection against malware such as viruses, trojans, spyware and the like designed to enact financial fraud.

BACKGROUND

The Internet is widely used to provide services to the general public. Services include financial services such as online banking, as well as online shopping. Criminals have not been slow to seek profit from the Internet.

"Malware" is a general term that refers to software designed to infect and/or damage a user's computer. An example type of malware is spyware that has been designed for illegal use. Such spyware records information entered by the user into a computer. The information is then forwarded by the spyware to an attacker. The attacker examines the recorded information to look for data such as the user's bank username and password that may have been entered by the user to access an online bank account. The attacker can then use the username and password to log onto the user's bank account and execute fraudulent transactions.

Spyware can also be used in combination with "phishing". Phishing involves an attacker sending messages to recipients, mainly in the form of e-mails, with the message claiming to be from a legitimate organisation such as a bank. The message would typically request the recipient to provide their account details to the organisation, either by replying to the e-mail or by clicking a hyperlink contained within the e-mail. In the latter example, the user will be directed to a fake website designed by the attacker to deceive the user into thinking it is a legitimate website. Any details that the user provides, either by e-mail or through the website, are stored by the attacker for use in fraudulent transactions. In order to increase the effectiveness of a phishing attack, the attacker may use spyware to collect user specific information and tailor a phishing email accordingly.

Spyware can be introduced onto a user's computer by means of a so-called "trojan". A trojan is a program that is installed unknowingly by a user and which can carry spyware as its payload. The trojan disguises itself either as legitimate software, or is downloaded and installed simultaneously with legitimate software. The trojan can also be sent as an e-mail attachment, for example being attached to a fake e-mail claiming to be from a bank so as to trick the user into installing the spyware. Once the spyware is installed it is designed to remain concealed and to monitor computer activity by, for example, performing keylogging, and on certain user actions to interfere with the functioning of the user's software. The data obtained by the spyware is sent to the attacker to analyse and recover sensitive details relating to the user, such as bank passwords and the like, so that the attacker can use the sensitive details to commit fraud. Trojans specifically designed to enact financial fraud are known in the art as "banking trojans".

As well as introducing spyware, a banking trojan can install other types of malware which cause a user's web browser to be directed to an attacker's server even though the user enters a "trusted" web site address. The attacker's server operates as a middleman between the user's browser and the trusted server. Any data entered by the user is rerouted to the attacker's server and any information from the legitimate website can be edited before being displayed to the user. During the session the attacker's server can add or interfere with the user's transactions without the user knowing. An attack of this nature, where the attacker modifies data as it is being entered by the user, is known as a "Man-in-the-Middle" (MITM) attack.

Another form of rerouting attack used by banking trojans involves the malware rerouting traffic from a trusted web site to an attacker's server. This is known "Pharming" and involves the attacker's server presenting the user with a fake website which requests the user to enter their login details. The login details are stored by the server and the server informs the user that the website is down and asks the user to try again later. As the login requested by the user is not actually made, the collected login details remain "fresh".

An even more dangerous form of banking trojan has now appeared. This type of banking trojan can introduce malware which does not need to capture actual data from the user, but rather only needs to capture the sessions in which the service transaction takes place. More specifically, the malware hooks into the web browser and no rerouting to an attacker's server is required. This type of malware is dangerous because it piggybacks on the valid authentication and authorisation mechanisms and does not need to know any details of these. In addition, it can circumvent end-to-end security mechanisms such as Secure Socket Layer (SSL) and Transport Layer Security (TLS).

On finding that the user is visiting an online bank, the malware modifies or adds transactions in order to transfer money from the user's account to the attacker's account. The malware would then arrange for the transferred money to be quickly withdrawn from the attacker's account. Typically, a local money laundering "mule" is used to withdraw the money, i.e. a person who is local to the user's country. This avoids the delay caused in transferring money between different countries and makes it very difficult for policing agencies to trace the person responsible for the crime.

Such malware identifies specific traffic using a list of sites (URLs) and other tags that the attacker wishes to target and comparing visited addresses against these URLs and tags. When the trojan installs the malware, it stores the list in an area of computer memory, possibly after downloading the list from a server that the attacker maintains if the trojan itself does not contain the list. The list would typically consist of banking strings including, for example, whole or partial banking URLs, regular expressions that match bank URLs, strings which match bank web pages (like "Welcome to . . . Bank" or "accountbalance.jsp"), any of the preceding strings that have been obscured to avoid identification, or cryptographic hashes of the preceding strings. For an obscured or encrypted list, the malware can identify the traffic by first obscuring/encrypting the traffic and then comparing the obscured/encrypted traffic against the list.

FIG. 1 illustrates schematically an example of how a banking trojan might operate. This involves circumventing the SSL or TLS encryption by injecting (Application Programming Interface, API) hooks into web browser functions that handle unencrypted traffic, i.e. the malware works with the sensitive data prior to encryption. Each time the user enters data into the browser, either as a URL or into a web form, the malware intercepts the data before the computer sends the data over the Internet. The malware searches the data for banking strings and, if a positive match is found, the malware activates a process for monitoring, adding, and modifying transactions. The malware would typically hook wininet.dll functions that are related to downloading web pages.

Conventional anti-virus applications identify viruses based upon virus signatures and heuristics, i.e. behavioural rules, using a search of the computer's hard disk. In the case of a crude banking trojan, it should be possible to scan the computer system and find a previously identified malware signature. In some cases, the malware will be in a packed form (both for reasons of efficiency and in an attempt to hide the malware) and hence the actual malicious code will not exist as such on the hard disk. At execution of the malware (e.g. on start-up of a computer), the code is unpacked and stored in the system memory (i.e. the computer's RAM). Of course, if a particular packed trojan has been detected by an anti-virus application provider, the provider can generate and issue a signature also for the packed trojan. Nonetheless, packing does allow attackers to "mutate" malware easily and quickly.

The signature approach works well providing that malware has been detected by the anti-virus application provider, and that a computer has been updated with the new signature(s). Of course this is not always the case, particularly as banking trojan attacks are often targeted (i.e. they are not "broadcast") to keep their visibility low and to reduce the chances of anti-virus application providers generating and providing signatures for the malware. Furthermore, some malware may be able to hide itself from an anti-virus application, for example by intercepting memory calls by the application to filter out the malware code.

A heuristic approach is typically used in conjunction with a signature scanning approach in order to detect unknown or "cloaked" viruses. The former involves monitoring the behaviour of the computer system to look for suspicious behaviour and indicators. On finding such behaviour or indicators, the anti-virus application will notify the user, inform him or her of the program or file responsible, and possibly act to inhibit the malware and disinfect the computer.

SUMMARY

The technology disclosed herein stems from a realisation that a signature-based approach, previously applicable only to known malware, can also be applied to detect unknown malware by using URLs and other data, indicative of financial targets, as signatures.

According to a first aspect of the technology disclosed herein there is provided a method of detecting malware on a computer and comprising scanning a system memory of the computer, and/or code being injected into the system memory, for known Universal Resource Locators and/or partial Universal Resource Locators, which Locators or partial Locators are indicative of malware.

Embodiments of the technology disclosed herein are able to detect previously unknown malware based upon the presence within the malware of strings indicative of financial transactions and websites.

In a preferred example embodiment, a list of known Universal Resource Locators and/or partial Universal Resource Locators is maintained on the computer and is periodically updating by downloading updates from a service provider.

Resources may be saved by scanning only when an Internet browser is open. Alternatively, the opening of the browser may act as a trigger for an additional scan.

According to an example embodiment, upon detecting a known Universal Resource Locators and/or partial Universal Resource Locators, the source may be located and a determination made as to whether or not the source is an authorised source.

In order to detect malware which makes use of encrypted strings, the scan may use encrypted Universal Resource Locators and/or partial Universal Resource Locators.

According to a second example aspect of the technology disclosed herein there is provided a method of detecting malware on a computer and comprising:
  detecting when an Internet browser is opened; and
  upon said detection, scanning code being injected into the system memory for known strings indicative of malware.

The method may involve scanning only code being injected into a part of the system memory associated with the Internet browser. Scanning may be performed by a hypervisor.

According to a third example aspect of the technology disclosed herein there is provided a method of detecting malware on a computer and comprising scanning a system memory of the computer, allocated to an emulation environment, and/or code being injected into the system memory, for known strings indicative of malware.

According to a fourth example aspect of the technology disclosed herein there is provided a method of detecting malware on a computer and comprising scanning memory of the computer and/or code being injected into the memory for known banking strings.

A scan may be triggered based upon one or more of:
  a process seeking to open, modify or monitor a browser;
  a process seeking to perform image or video capture on a web browser;
  a process seeking to install a browser plugin or browser help object;
  a process seeking to install a Layered Socket Provider.

Scanning may be performed on one or more of:
  a system memory;
  driver memory;
  a kernel memory.

According to a fifth example aspect of the technology disclosed herein there is provided a computer program for use on a computer and arranged in use to scan system memory of the computer and/or code being injected into the system memory, for known strings indicative of malware.

According to a sixth example aspect of the technology disclosed herein there is provided a method of detecting malware on a computer and comprising:
  pre-defining one or more suspect inter-process communication functions as suspect;
  detecting a call to a suspect function; and
  upon detection, scanning part or all of the system memory for known banking strings.

Scanning may be performed only on system memory associated with the process or processes making the detected function call.

The or each function may be one of an API, COM, OLE, and DDE function.

DETAILED DESCRIPTION

A malware detection application (referred to here as an "anti-virus" application) will now be described which uses a heuristic approach to detect malware. The heuristic approach may be used in combination with traditional signature/heuristic scanning approaches to detect malware.

Figure 3:
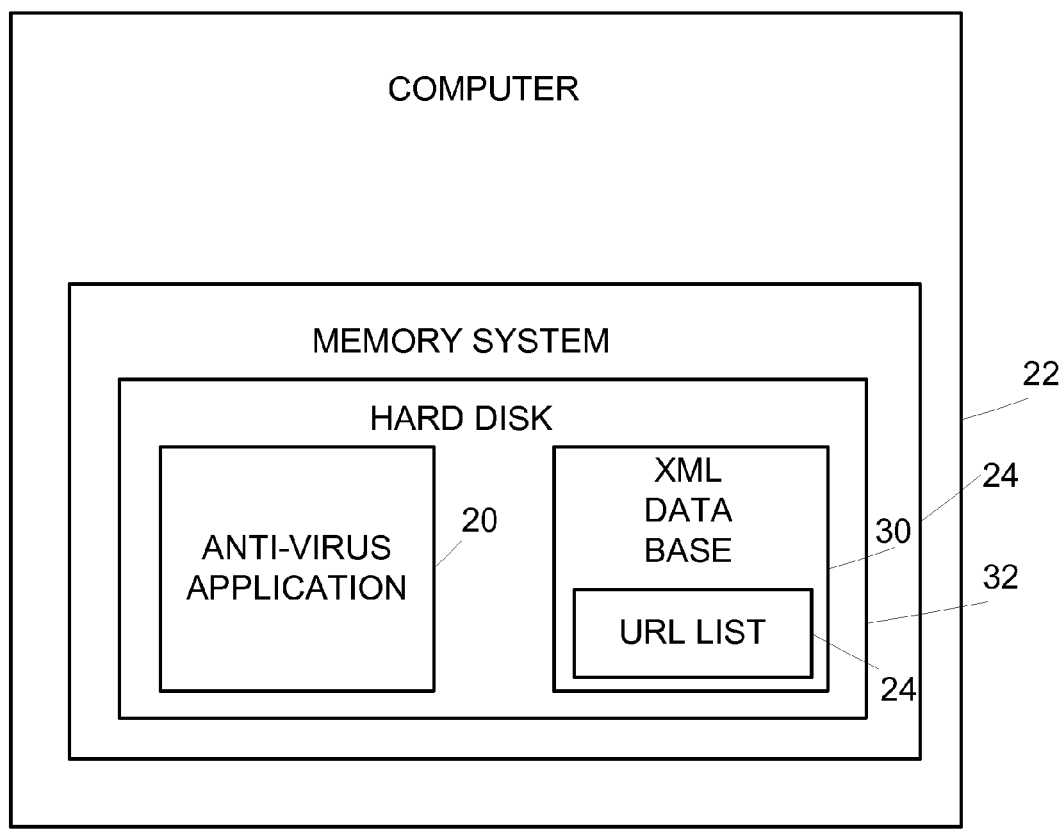
FIG. 3 is a diagrammatic view of an example embodiment computer.

By way of background explanation, and with reference to FIG. 3, an anti-virus application 20 is typically arranged to auto-start on a computer 22, i.e. immediately following booting of the computer 22. The anti-virus application 20 scans the computer system for malware following auto-start, and periodically thereafter, for example once a day. The application 20 may also perform scans at specific events, e.g. receipt of an email. The anti-virus application 20 described here uses a wide set of tools and techniques including some that are already known in the art, such as heuristics and emulation technology, as well as the new techniques of the technology disclosed herein. The operation of some the new techniques may not necessarily be periodic (as described below).

It is recognised that malware of the "banking trojan" type typically identifies when financial transactions are being instigated on a computer by using a list 24 of URLs and/or other strings indicative of financial targets. It is proposed here to similarly provide the anti-virus application 20 with a list of URLs, partial URLs, and possibly other strings, which might be present with or accessible to malware intent on conducting financial fraud. This list 24 may be stored in an XML database 30 on the computer 22 (and may be regularly updated by the anti-virus application 20). For example the list could include the following strings: "hsbc bank", "hsbc", "hsbc.com", "abbey", etc. The integrity of the XML database 30 is maintained by ensuring that it is only accessible to the anti-virus application.

A successful malware detection strategy will combine a number of scanning approaches and mechanisms. Firstly, the strategy should attempt to identify malware prior to its being installed on a computer. Secondly, it should be able to clean up an already infected computer prior to the malware introducing a fraudulent transaction. Thirdly, it should be able to detect the attempted introduction of fraudulent transactions.

To address the first of these, the anti-virus application 20 should try to detect malware at the time when the malware is first received at a computer 22, e.g. during an Internet download and prior to it being installed on the computer system. To this end, the anti-virus application is arranged to monitor and intercept all executable files being downloaded onto the computer, and prior to their execution.

When a file is downloaded onto a computer, e.g. over the Internet, it is first stored onto the hard disk 32. At the time of downloading, it will not be possible to know whether the file is packed or unpacked. The anti-virus application 20 will therefore go through the following procedure for all downloaded files of a suspect type. The anti-virus application 20 will block all access to the file until it has been scanned.

The anti-virus application 20 firstly assumes that the downloaded file is not packed. The application 20 scans the downloaded file for strings contained within the list it maintains on the computer 22. It is also possible that the anti-virus application may search for a combination of strings before declaring a file to be suspect. For example, a typical banking trojan will contain many different bank URLs, as opposed to a legitimate application which would only require one or a small number. If a positive match is made, the anti-virus application compares the suspect file against files maintained on a "whitelist". If the file is not on the whitelist, the user is informed accordingly and the suspect file may be deleted from the computer memory 24. A copy of the file may be sent to the anti-virus application 20 vendor to allow the vendor to update its database of known malware signatures. It is noted that the anti-virus application 20 may also apply standard decryption tools during the searching of the file to find banking strings that have been encrypted.

If no positive match is made, the anti-virus application 20 uses a set of unpacking tools (which are known in the art) to attempt to unpack the downloaded file. The unpacked file is stored in a section of the computer memory and is searched in a manner similar to that previously described to detect whether the file is a banking trojan.

Figure 1:
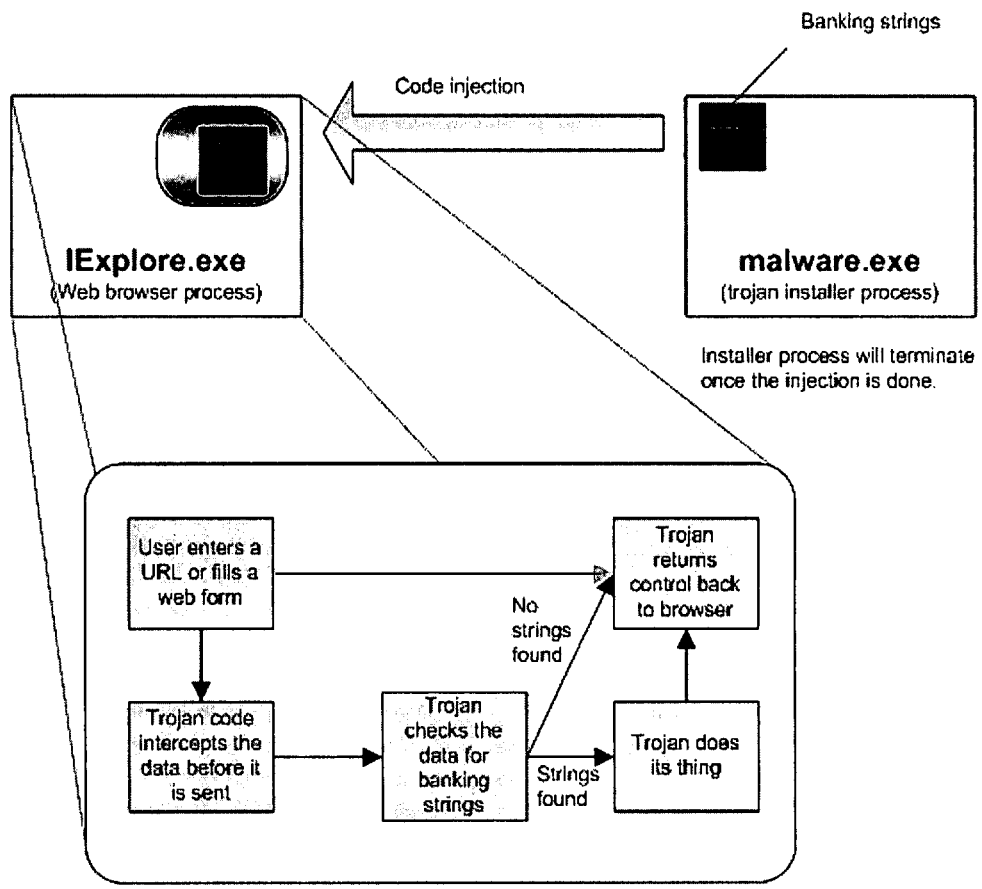
FIG. 1 illustrates schematically a known banking trojan attack mechanism.
Figure 2A:
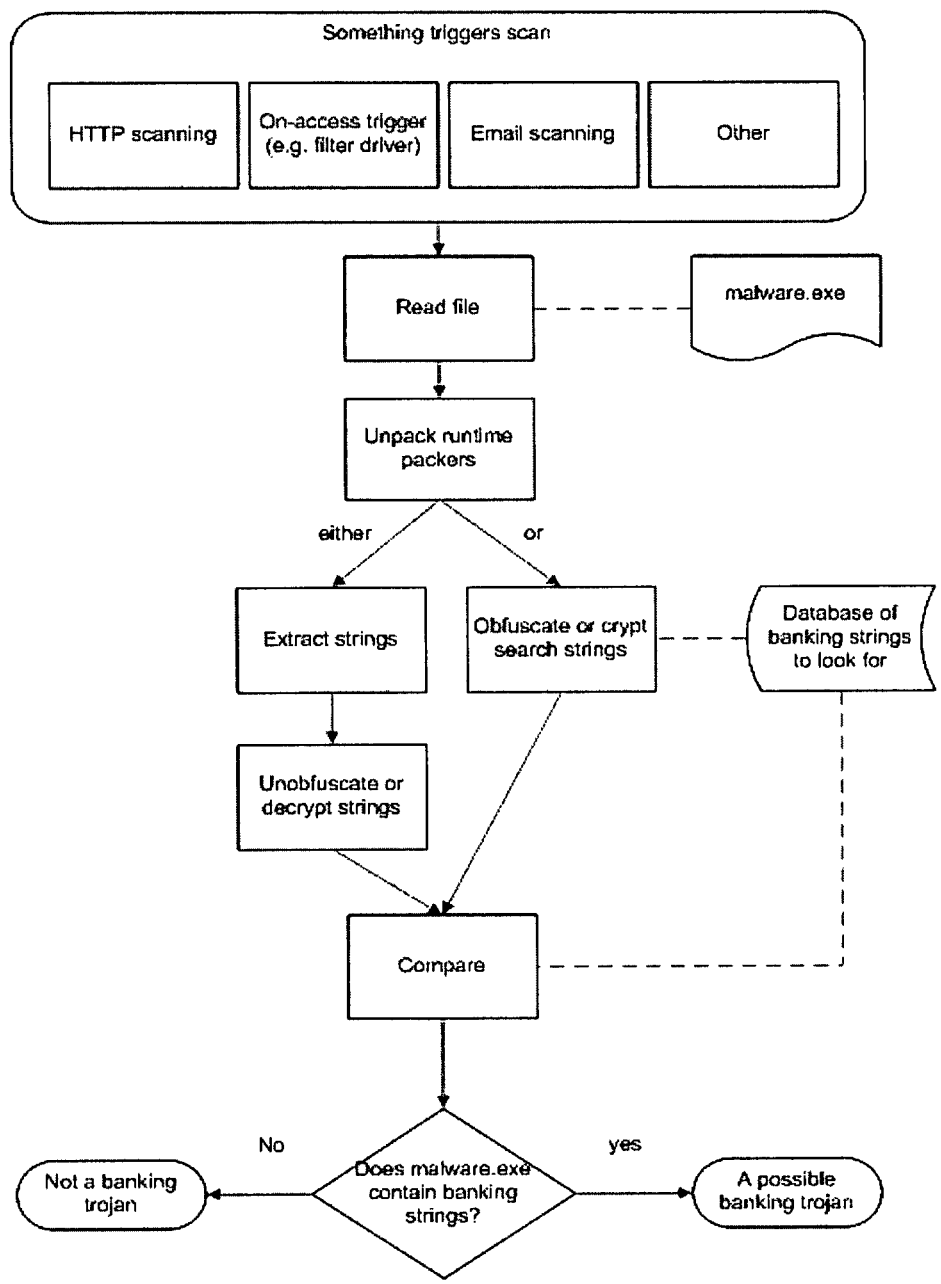
FIGS. 2a to 2c are flow diagrams illustrating three different banking trojan detection schemes.

This first detection approach is illustrated further by the flow diagram of FIG. 2a. This process is applicable to email scanning and other events in addition to downloading. It will be appreciated that the underlying methodology is substantially conventional. The technology disclosed herein encompasses using this methodology to search for strings indicative of financial transactions and therefore indicative of the presence of a banking trojan.

If a downloaded scan contains malware, but the scans described above fail to identify it as such, this may be because the anti-virus application has failed to unpack the malware successfully or perhaps because the banking strings are only downloaded by the malware at a later time. To deal with this, the anti-virus application may store and run the file in a virtual environment using emulation techniques already known in the art, immediately following the file download. The malware file will not be aware that it is being run within a virtual environment. Hence, on being executed, the malware is tricked into copying the malware disk image into the virtual system memory to create a malware run-time image. If packed, the malware will unpack itself in the system memory, creating a "plaintext" image. If the list of strings used by the malware to identify targets is not contained within the malware code itself, the malware will load this into the virtual system memory. The anti-virus application 20 then performs a scan of the virtual system memory for banking strings based upon the list that it maintains and takes appropriate action.

As alternative to emulation techniques, the malware file may be run by an application that runs the malware as a real process in a real environment. The application 20 monitors and controls the malware activity within the operating system, by for example using operating system APIs. On the basis of the malware's activity, the application 20 can determine whether or not the file is malicious and at the same time has sufficient control over the malware such that it can stop it from actually causing any damage to the computer. This approach may involve the use of an "application firewall" or a Host Based Intrusion Detection (HIPS) solution.

The anti-virus application 20 additionally scans the computer 22 for already installed and running malware (e.g. as a result of the malware auto-running on download or at power-up of the computer). This is necessary to detect malware downloaded prior to installation of the anti-virus application 20 or malware which was not detected at installation.

An executing malware will exist in the system memory 24, having unpacked itself if necessary. Therefore, the banking strings may be present within the system memory 24 (e.g. comprising RAM, as opposed to the disk memory). The anti-virus application 20 periodically searches all currently allocated areas of the system memory 24, including modules and the memory stack and heap, for the presence of banking strings. This search is similar to that described already, in the context of searching a suspected malware file in a virtual environment. Previously used but currently de-allocated areas of system memory may also be searched (in order to search "ghost" images).

By way of illustration, the results of a system memory scan on an infected computer 22 might contain the following:

```
String related to alpha (banking) in Explorer.EXE (PID: 1388)
    Match:    Search string "alpha." found in "alpha.com"
    Location: Stack or heap at address 0x018b02a5
String related to beta (banking) in IExplore.exe (PID: 1528)
    Match:    Search string "beta." found in "beta.co.uk"
    Location: Stack or heap at address 0x00208edd
Sring related to gamma (banking) in Explorer.EXE (PID: 1388)
    Match:    Search string "gamma" found in "gamma.org"
    Location: Stack or heap at address 0x018b02ef
```

A above sample shows the searched for strings, together with the banking strings found in the system memory 24. The locations of the banking strings within the computer memory 24 are also shown.

Upon detection of malware, the anti-virus application 20 will alert the user that the computer is infected and will act to disable the malware and, if possible, remove the malware from the computer 22. In some case it might be difficult to identify the process, thread, module etc which was responsible for injecting the suspect code into the system memory 24. However, one way to do this is to record the suspect code, reboot the computer 22, and identify the component which is injecting the stored and suspect code. The anti-virus application 20 then copies the malware disk image and sends a copy of it to the anti-virus manufacturer's server so that a signature can be created for it.

Figure 2B:
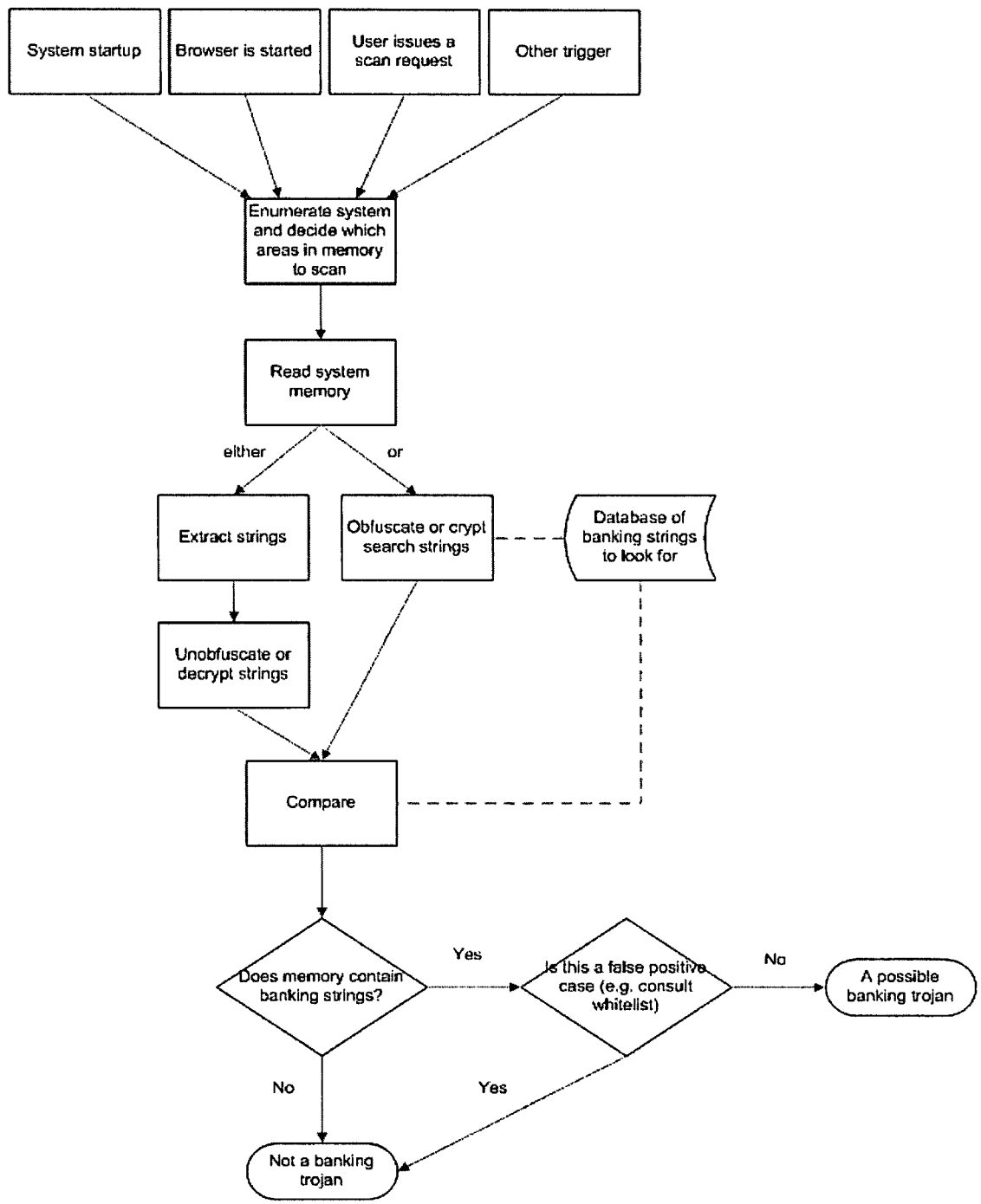

This second approach to detecting banking trojans is further illustrated in the flow diagram of FIG. 2b.

It should be noted that, once running, malware may be able to monitor which applications are running on the computer 22, and in particular gather information relating to anti-virus application processes 20. The malware can use this information to hide itself from the scanning activities of the anti-virus software. This may make it difficult for the anti-virus application 20 to detect the malware using standard heuristic and scanning techniques alone. However, the detection scheme described here is unlikely to be affected by such cloaking mechanisms as the malware must insert its code into the system memory 24 at some stage.

It may be possible to optimise the system performance by performing system memoryscans only when the web browser is running.

It is possible that malware infecting a computer 22 may be of a type that is only executed when the web browser is opened. Such malware may work by modifying the web browser such that it executes the malware as a "browser extension" (in the case of Firefox™) or a "Browser Helper Object" (BHO) (in the case of Microsoft Internet Explorer™). In the case of Internet Explorer™, the malware modifies the computer's registry settings so that the web browser automatically loads the malware in the form of the BHO. In contrast, in Firefox™, no modification of the registry settings is required. The malware only needs to copy the file to the Firefox™ plug-in directory. In this case, the banking strings are only going to appear in the system memory when the web browser is opened. It is even possible that the malware could be arranged such that the strings are only inserted when some specified web browser action takes place. For example, the trigger might be the user entering a URL (i.e. www.*.*). In this case, periodic scanning of the system memory 24 may not detect the malware before a fraudulent transaction has occurred. Moreover, if the strings are removed after the transaction has occurred, a subsequent scan may also fail to detect the malware.

To address this situation, in addition to periodic scanning of the system memory 24, the anti-virus application 20 can be arranged to operate as a gatekeeper, monitoring code being injected into the browser memory space. On detecting that a banking string is being inserted, the anti-virus application 20 traces the source of that string. The anti-virus application 20 may maintain a "whitelist" identifying plug-ins authorised to insert banking strings into the system memory. If a plug-in is on the whitelist it is allowed to continue operating. However, if it is not on the whitelist, the anti-virus application 20 suspends the plug-in operation and opens a dialogue screen with the user and flags up the plug-in as being potential malware. The user can then decide whether or not the plug-in can continue to operate. If the user refuses to authorise the plug-in, the anti-virus application 20 can send a sample of the plug-in to the anti-virus application vendor for testing.

Figure 2C:
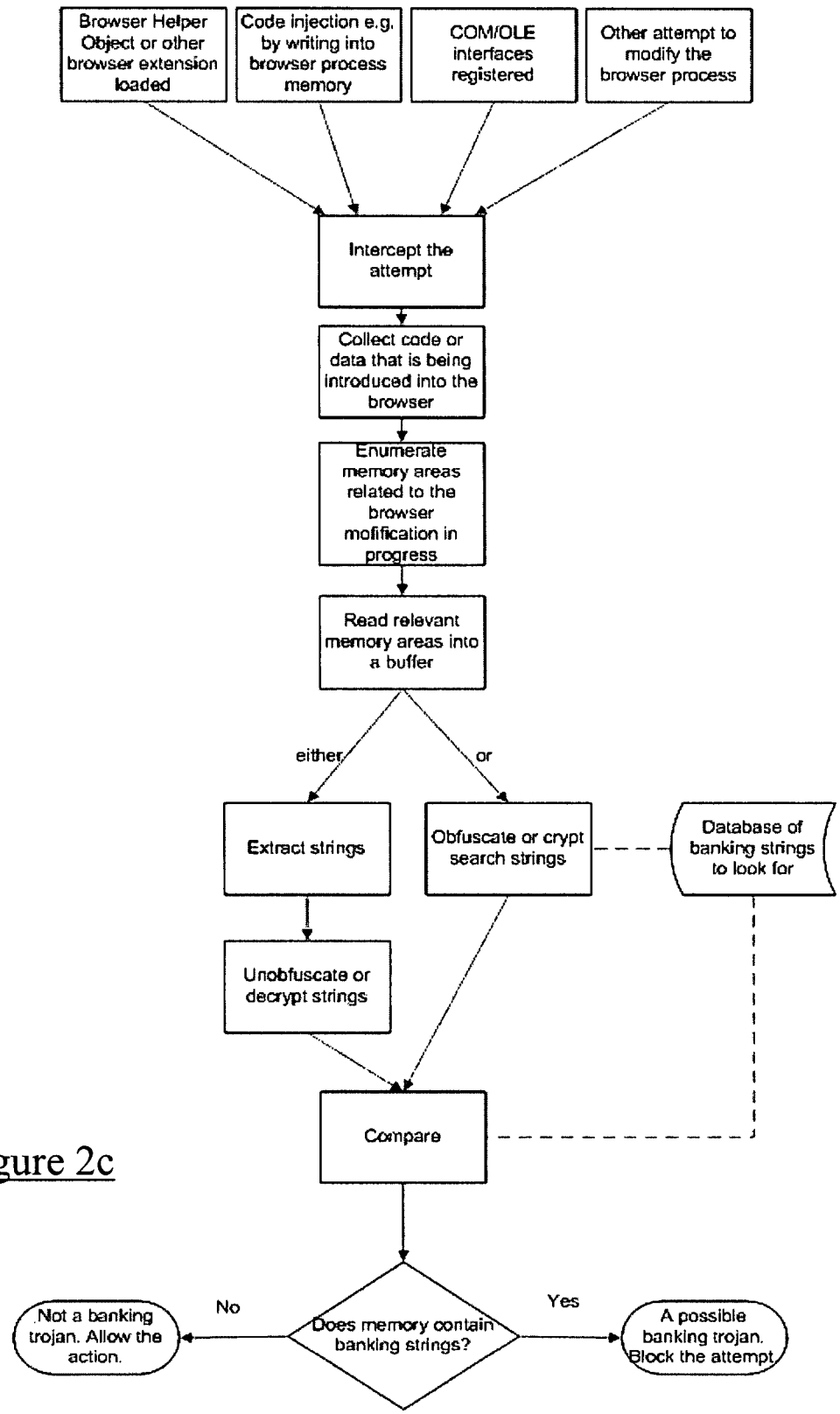

This gatekeeper based detection approach is illustrated in the flow diagram of FIG. 2c.

In order to avoid a gatekeeper-based detection approach, malware make use of an inter-process communication function such as a Windows™ or application specific API. For example, a malware could use the screen-shot API to capture an image of the browser containing a user's login details. Alternatively, malware could make use of some other suitable function such as a COM, OLE, or DDE. To address this, the anti-virus application may define certain function calls as suspect, and use such calls as scanning triggers. In this case, it may only be necessary to scan the system memory 24 allocated to the process making the function call.

For greater effectiveness in detecting malware and reducing the load on the system during scanning, the anti-virus software may have the ability to scan the computer memory 24 used by all processes, to scan through the computer kernel memory, to skip the scanning of modules signed by Microsoft™ and other known parties (as these are already safe), to skip the scanning of certain processes that the malware would not use, and to be functional enough to decrypt currently used obfuscation techniques used by typical malware associated with banking trojans.

There may be instances in which the malware actually maintains a coded banking string list which is never decrypted as a means of circumventing the string based mechanism described here. This type of malware works by encoding all the data related to the web browsing session and comparing the coded data to the encoded banking string list. The coding could take the form of simple obfuscation, such as replacing characters in the strings by a character that is removed from it in the alphabet by a certain number of places, or hashing the strings using a one-way hash function. A solution to this problem is for the anti-virus application to similarly encrypt/obfuscate the strings which it is using to conduct the search.

It will be appreciated that although embodiments of the technology disclosed herein have been described for use with malware associated with banking trojans, variations can be made to make the technology disclosed herein invention suitable for other types of malware which use strings to trigger hooks into computer processes or applications.

The invention claimed is:

1. A method of detecting unknown malware on a computer, the method comprising:

using the computer to scan code stored in a system memory of the computer, and/or code being injected into the system memory, for the presence of known Universal Resource Locators and/or partial Universal Resource Locators identifying trusted websites, which known Universal Resource Locators or partial Universal Resource Locators may be used by malware during execution of the malware, and, upon detecting a known Universal Resource Locator and/or partial Universal Resource Locator that identifies a trusted website, locating the source of suspect code containing the detected known Universal Resource Locator and/or partial Universal Resource Locator and determining whether or not the source is an authorised source and, if not, identifying the source as potential malware.

2. The method according to claim 1, wherein said Universal Resource Locators and/or partial Universal Resource Locators are indicative of financial transactions.

3. The method according to claim 1, further comprising maintaining a list of known Universal Resource Locators and/or partial Universal Resource Locators on the computer and periodically updating the list by downloading updates from a service provider.

4. The method according to claim 1, further comprising scanning only when an Internet browser is open.

5. The method according to claim 1, further comprising performing the scan for known Universal Resource Locators and/or partial Universal Resource Locators, where the known Universal Resource Locators and/or partial Universal Resource Locators are in an encrypted form.

6. The method according to claim 1, further comprising:
using the computer to detect when an Internet browser is opened; and
upon said detection, performing said scan on code being injected into the system memory.

7. The method according to claim 6, further comprising scanning only code being injected into a part of the system memory associated with the Internet browser.

8. The method according to claim 1, wherein said system memory of the computer is a virtual system memory allocated to an emulation environment.

9. The method according to claim 1, further comprising triggering a scan based upon one or more of:
a process seeking to open, modify or monitor a browser;
a process seeking to perform image or video capture on a web browser;
a process seeking to install a browser plugin or browser help object;
a process seeking to install a Layered Socket Provider.

10. The method according to claim 1, further comprising additionally performing said scan on code contained within one or more of a driver memory and a kernel memory.

11. The method according to claim 1, wherein said scanning is performed by a hypervisor.

12. The method according to claim 1, further comprising:
using the computer to pre-define one or more suspect inter-process communication functions as suspect;
using the computer to detect a call to a suspect function; and
upon detection, using the computer to perform said scan on part or all of the system memory.

13. The method according to claim 12, further comprising scanning only system memory associated with the process or processes making the detected function call.

14. The method according to claim 12, wherein the or each function is one of an Application Programming Interface (API) call, Component Object Model (COM) function, Object Linking and Embedding (OLE) function, and Dynamic Data Exchange (DDE) function.

15. The method according to claim 1, further comprising detecting the known Universal Resource Locator and/or partial Universal Resource Locator that identifies the trusted website by comparing URLs in the code against a list of trusted URLs stored on the computer.

16. A computer program for use on a computer, the computer program comprising instructions stored in non-transitory computer readable media and configured upon execution by a computer to: scan code stored in a system memory of the computer, and/or code being injected into the system memory, for the presence of known Universal Resource Locators and/or partial Universal Resource Locators identifying trusted web sites, which known Universal Resource Locators or partial Universal Resource Locators may be used by malware during execution, and, upon detecting a known Universal Resource Locator and/or partial Universal Resource Locator that identifies a trusted website, to locate the source of suspect code containing the detected known Universal Resource Locator and/or partial Universal Resource Locator and determine whether or not the source is an authorised source and, if not, identify the source as potential malware.

17. The computer program of claim 16 wherein the instructions are configured to detect the known Universal Resource Locator and/or partial Universal Resource Locator that identifies the trusted website by comparing URLs in the code against a list of trusted URLs stored on the computer.

* * * * *